R. R. LANGLEY.
PLANTER.
APPLICATION FILED SEPT. 10, 1909.
1,024,208.
Patented Apr. 23, 1912.
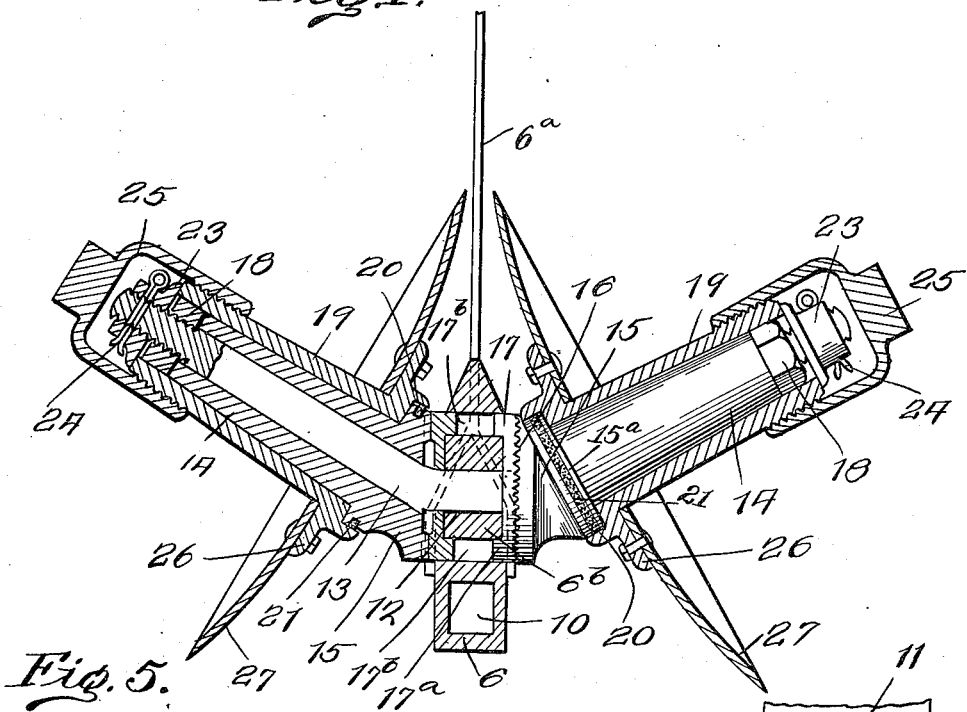
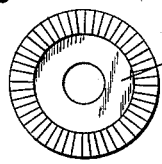
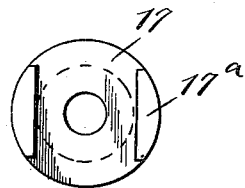
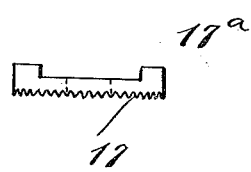
Witnesses
B. Brown
George R. Bliss
Inventor
R. R. Langley.
By
H. H. Bliss.
Attorney
COLUMBIA PLANOGRAPH CO., WASHINGTON, D. C.

UNITED STATES PATENT OFFICE.

RALPH R. LANGLEY, OF LINCOLN, NEBRASKA.

PLANTER.

1,024,208.

Specification of Letters Patent.   Patented Apr. 23, 1912.

Application filed September 10, 1909. Serial No. 517,094.

*To all whom it may concern:*

Be it known that I, RALPH R. LANGLEY, a citizen of the United States, residing at Lincoln, in the county of Lancaster and State of Nebraska, have invented certain new and useful Improvements in Planters, of which the following is a specification, reference being had therein to the accompanying drawing.

My invention relates to planters and more particularly to loose ground listers for potatoes or corn.

This present invention is an improvement upon the mechanism shown in my Patents Nos. 927,555 and 928,203, issued July 13th, 1909, and has as its object to provide improved means for mounting the furrow opening disks shown in these two patents and for holding them in any desired position of adjustment.

Figure 1 is a horizontal cross sectional view taken through the disks and disk mounting devices. Fig. 2 is a side elevation on a reduced scale of the disks, the disks supporting devices and associated parts. Figs. 3, 4 and 5 are detail views of one of the adjustment washers.

My invention relates particularly to the seed depositing mechanism and associated parts, and I have therefore shown in the drawings only those parts of a planter which are necessary for a ready and complete understanding of the invention.

The particular seeding mechanism shown in the drawings is adapted for use in planting corn. Between the bars 3, $3^d$ of the planter frame and in the same vertical longitudinal plane with the main planter wheels, are bolted shanks, one of which is represented by 6. Each of these shanks is an open metallic frame provided with appropriate strengthening ribs and otherwise shaped to possess the maximum of strength, and at the same time to have the various parts necessary for the work which it is intended to perform. The rear vertical member of the shank is made tubular to form a duct or passageway 10, which communicates at its upper end with a seed box 11, which is mounted upon the shank and which feeds the seed at regular intervals to the duct 10 by means of the mechanism usually employed for that purpose. An ordinary corn planter shoe or runner $6^a$ is secured to the lower end of the shank 6.

The lower plate $6^b$ of each shank 6 is provided with a vertically elongated slot 12, through which an axle 13 is passed for the support of the furrow opening disks 27. The end parts of the axle are bent through small angles with respect to the central part and are so disposed that they will project forward at each side of the shank and can be either rotated about a horizontal axis perpendicular to the plane of the plate $6^b$ or can be moved bodily vertically in the elongated slot 12 for the purpose of effecting adjustments to be hereafter explained. On each end part of the axle 13, an axle box 14 is located, provided with an enlarged inner end 15. This enlarged inner end is made with a collar $15^a$ in a plane perpendicular to the axis of the end part of the axle and with a beveled inner end face 16 adapted to lie in a vertical plane parallel to the plane of the shank and radially ribbed to coöperate with the correspondingly ribbed rose plate 17. This rose plate or washer 17 is provided upon that side which engages the shank with a pair of lugs $17^a$ which enter a pair of slots $17^b$ formed in the plate $6^b$ parallel to and one upon each side of the elongated slot 12.

Nuts 18 are screwed on the forwardly projecting end parts of the axle and bear against the outer ends of the boxes 14, forcing the latter into locked engagement with the plates 17 and the shoe 6. Hubs 19 are mounted to rotate on the axle-boxes and are provided at their inner ends with integral flanges 20 which overlap the collars $15^a$ of the said axle boxes. Between the flanges 20 and the collars $15^a$ of the axle boxes suitable dust proof packings 21 are disposed. The hubs 19 are held in place by caps 23 slipped over the ends of the axle end parts and bearing against the outer ends of the hubs. These caps are prevented from displacement by means of cotter pins or keys 24. A dust proof cap 25 is screwed on the outer end of each hub and incloses the outer end of the axle and the cap 23. The spaces within the caps 25 may be filled with a solid lubricant to supply the bearing surfaces between the hubs 19 and the boxes 14. Each hub 19 is provided at its inner end with an annular flange 26 to which a furrow opening disk 27 is securely bolted.

With the construction and arrangement of parts above described, it will be seen that when the nuts 18, at the ends of the axle members, are loosened, the axle-boxes can be disengaged from their locked connection with the washers 17 and shank 6 and the axle raised or lowered in the slot 12 for the purpose of raising or lowering the furrow-opening disk and thus regulating the depth of earth covering the seed. It will be apparent that when the parts have been thus loosened, the axle 12 can be partially rotated so as to alter the angle of its forwardly projecting members to the ground and thus cause the furrow-opening disks to become disposed a greater or less distance apart, at the bottom, thereby regulating the width of the furrow to be cut by said disks at both top and bottom of the furrow. By providing the rose plates or washers 17, the angular adjustment of the axle 13 can be maintained without unduly tightening the nuts 18, and at the same time the freedom of vertical adjustment of the axle is preserved, the washer being prevented from rotating about its axis by means of its lugs 17ª and at the same time being free to move vertically together with the axle boxes 14.

What I claim is:

1. In an agricultural implement, the combination of a frame, an earth working tool, an arm supporting the tool, a mounting for the arm with respect to which it is free to have both rotative adjustment and translative sliding adjustment, a plate intermediate the arm and the mounting and adapted to have translative sliding adjustment with the arm, the plate being formed with rose plate serrations adapted to engage the arm which is formed with mating serrations, means for preventing the intermediate plate from rotation with respect to the mounting, and a single clamping means slidable with the arm and plate and adapted to bind rigidly together the arm, the plate and the mounting in any position of adjustment.

2. In a planter, the combination of a frame, an earth working rotatable disk, an arm upon which the disk is rotatably mounted, a mounting for the arm with respect to which it is free to have translative sliding adjustment and rotative adjustment about an axis inclined to the axis of the arm, a plate intermediate the arm and mounting and adapted to have translative sliding adjustment with the arm, the plate being formed with rose plate serrations adapted to engage the arm which is formed with mating serrations, means for preventing the intermediate plate from rotation with respect to the mounting, and a single clamping means slidable with the arm and the plate and serving to bind rigidly together the arm, the plate and the mounting in any position of adjustment.

3. In a planter, the combination of a frame, a seed delivering mechanism, two furrow opening disks, a bent axle arranged to support the disks symmetrically upon the two sides of the seed delivery mechanism the axle being threaded at each end, a central supporting frame for the axle having a vertical slot in which the axle can be adjusted either rotatively or vertically, axle boxes one at each side of the frame each having its inner end face radially serrated, two washers one at each side of the frame, the washers being radially serrated on their outer faces for engagement with the inner faces of the boxes and provided on their inner faces with devices coöperating with mating devices on the supporting frame to prevent rotation of the washer while permitting vertical movement thereof, and nuts on the threaded axle ends for clamping the axle, axle boxes, washers and supporting frame into one rigid structure, with the axle in any desired position of adjustment both vertically and angularly.

4. In a planter, the combination of a frame, a seed delivering mechanism, two furrow opening disks, a bent axle threaded at its ends and supporting the disks symmetrically upon the two sides of the seed delivery mechanism, a central supporting frame for the axle having a vertical slot in which the axle can be adjusted either rotatively or vertically and other vertical slots at the sides of the said axle slot, axle boxes, one on each side of the frame, each having its inner end face radially serrated, two washers, one at each side of the frame, the washers being radially serrated on their outer faces and provided on their inner faces with lugs adapted to enter the vertical slots in the supporting frame at the sides of the axle slot, and nuts on the threaded axle ends for clamping the axle, axle boxes, washers and supporting frame into one rigid structure with the axle in any desired position of adjustment both vertically and angularly.

In testimony whereof I affix my signature, in presence of two witnesses.

RALPH R. LANGLEY.

Witnesses:
C. P. A. FRIBERG,
O. A. TREFZ.